United States Patent [19]
Steinmeyer

[11] Patent Number: 5,291,297
[45] Date of Patent: Mar. 1, 1994

[54] ILLUSTION CREATING APPARATUS COMPRISING A HOUSING AND A CRT

[76] Inventor: Jim Steinmeyer, 222 N. Fairview, Burbank, Calif. 91505

[21] Appl. No.: 836,067

[22] Filed: Feb. 13, 1992

[51] Int. Cl.⁵ .................. H04N 5/64; H04N 13/00
[52] U.S. Cl. ............................ 348/44; 353/28; 353/37; 472/58; 472/61; 348/51; 348/781
[58] Field of Search ............... 358/231, 250, 88, 89, 358/87, 237, 1, 254; 354/437; 353/28, 30, 37, 10; 359/838; 492/57, 58, 60, 61, 63; H04N 13/00, 5/64

[56] References Cited

U.S. PATENT DOCUMENTS

| | | | |
|---|---|---|---|
| 1,456,233 | 5/1923 | Hammond | 353/28 |
| 2,061,378 | 11/1936 | Henze | 353/28 |
| 2,075,198 | 3/1937 | Henze | 353/28 |
| 2,232,110 | 2/1941 | Gruenhut | 353/28 |
| 2,336,508 | 12/1943 | Smith | 353/37 |
| 3,084,933 | 4/1963 | Alswang | 353/28 |
| 3,085,799 | 4/1963 | Alswang | 353/28 |
| 3,582,961 | 5/1967 | Shindo | 358/89 |
| 3,707,115 | 12/1972 | Rush | 353/28 |
| 4,306,768 | 12/1981 | Eggins | 350/174 |
| 4,605,291 | 8/1986 | Jolly | 358/250 |
| 4,738,522 | 4/1988 | Lunde et al. | 353/30 |
| 4,927,238 | 5/1990 | Green | 352/86 |

Primary Examiner—Mark R. Powell
Assistant Examiner—Chris Grant
Attorney, Agent, or Firm—J. E. Brunton

[57] ABSTRACT

An apparatus for creating an illusion in which a setting is superimposed around a real image rather a reflected image being superimposed into the middle of the setting as is traditionally the case. More particularly, rather than images being superimposed into a setting by using a beam splitter in the traditional manner, a real, not a reflected image, is used and the setting is superimposed around the real image. In the apparatus of the invention, there are no dead or hidden areas and set proportions are not dictated by the angle of a beam splitter. Additionally, viewing angles do not dictate audience position and, so long as the audience can see inside the setting, the illusion can be created.

14 Claims, 2 Drawing Sheets

ILLUSTRATION CREATING APPARATUS COMPRISING A HOUSING AND A CRT

BACKGROUND OF THE INVENTION

1. Field of The Invention

The present inventions relates generally to an apparatus for creating visual images. More particularly, the invention involves an illusion in which a setting is superimposed around a real image rather a reflected image being superimposed into the middle of the setting as is traditionally the case.

2. Discussion of The Invention

In the past a number of approaches have been taken in the construction of apparatus for use theatrical and like performances to create optical illusions. As early as 1879 John H. Pepper and J. J. Walkers patented an apparatus designed to render an actor or object gradually visible or invisible, at will, and also to substitute for an object in sight of the audience the image of another similar object hidden from the direct vision of the audience. This apparatus and its use is described in the very early U.S. Pat. No. 221,605.

U.S. Pat. No. 4,306,768 issued to Egging discloses an apparatus for creating multi-planar images using computer generated images which are displayed on a display screen such as a TV monitor. A series of parallel mirrors are disposed at an angle to the monitor and act as beam splitters. Three dimensional models, which are reflected to the viewer or viewed through the beam splitters, are used to provide a combined image with a video display.

In U.S. Pat. No. 4,738,522 issued to Lunde, et al., there is disclosed an imaging apparatus which uses a first three dimensional set, and a second set which is occupied by live actors or other objects, which are to be incorporated into the three dimensional scene as a part of the illusion. A beam splitter is provided in front of the three dimensional set and a monitor or projector is positioned to project an image from the second set onto the beam splitter. The actors on the second set are then positioned to achieve the desired scale. The actor is then filmed in real time interacting with the blacked out second set props and the image is then recorded. The recorded image is then played back on the monitor and reflected onto the beam-splitter to give the illusion that the recorded image is interacting with the props in the three dimensional set.

The Lunde et al. approach is exemplary of the traditional approach wherein "ghosts", which are in reality video or film images, are superimposed into the middle of a setting by using beam splitters. In sharp contradiction, the present invention uses a real, not a reflected image, and superimposes the setting around it. This unique approach avoids many of the drawbacks of the traditional so called "Pepper's Ghost" type illusions. For example, there is a certain inefficiency to the traditional "Pepper's Ghost" set-up because there are necessary dead areas such as the area where the video monitor is located. Also, in the prior art illusions the viewing angles must carefully controlled so that each member of the audience is provided with a proper view of the "ghost" image. Further, the proportions of the apparatus are of necessity, dictated by the angle of the beam splitter and size of the image. For these and other reasons in certain applications the traditional approach either won't work or it creates substantial problems in certain applications.

As will be better understood from the description which follows in using the apparatus of the present invention, "Real Image" ghosts are not reflected, and there are no bad angles and no dead or hidden areas. If the audience can see inside the setting, they can see the illusion. Additionally, the "Real Image" set can be in any proportion. It need not be deeper than it is tall and it can be both shallow and wide. Because there are no hidden areas or special angles, the apparatus can be conveniently installed and used virtually anywhere. For example, the apparatus can easily be incorporated into an interactive display, taking images off of video disc and creating images in response to audience choices.

SUMMARY OF THE INVENTION

It is an object of the present invention to provide an apparatus for use in creating illusions in which, rather than images being superimposed into a setting by using a beam splitter in the traditional manner, a real, not a reflected image, is used and the setting is superimposed around the real image.

Another object of the invention is to provide an apparatus of the aforementioned character in which there are no dead or hidden areas and in which the set proportions are not dictated by the angle of a beam splitter.

Another object of the invention is to provide an apparatus as described in the proceeding paragraphs in which viewing angles do not dictate audience position and in which the illusion can be seen so long as the audience can see inside the setting.

Still another object of the invention is to provide an apparatus of the character described which is highly versatile in use, can be of almost any proportion and can be installed virtually anywhere.

Yet another object of the invention is to provide an apparatus which is of highly simple construction and one which can be inexpensively constructed and maintained.

DESCRIPTION OF THE INVENTION

Figure 1:
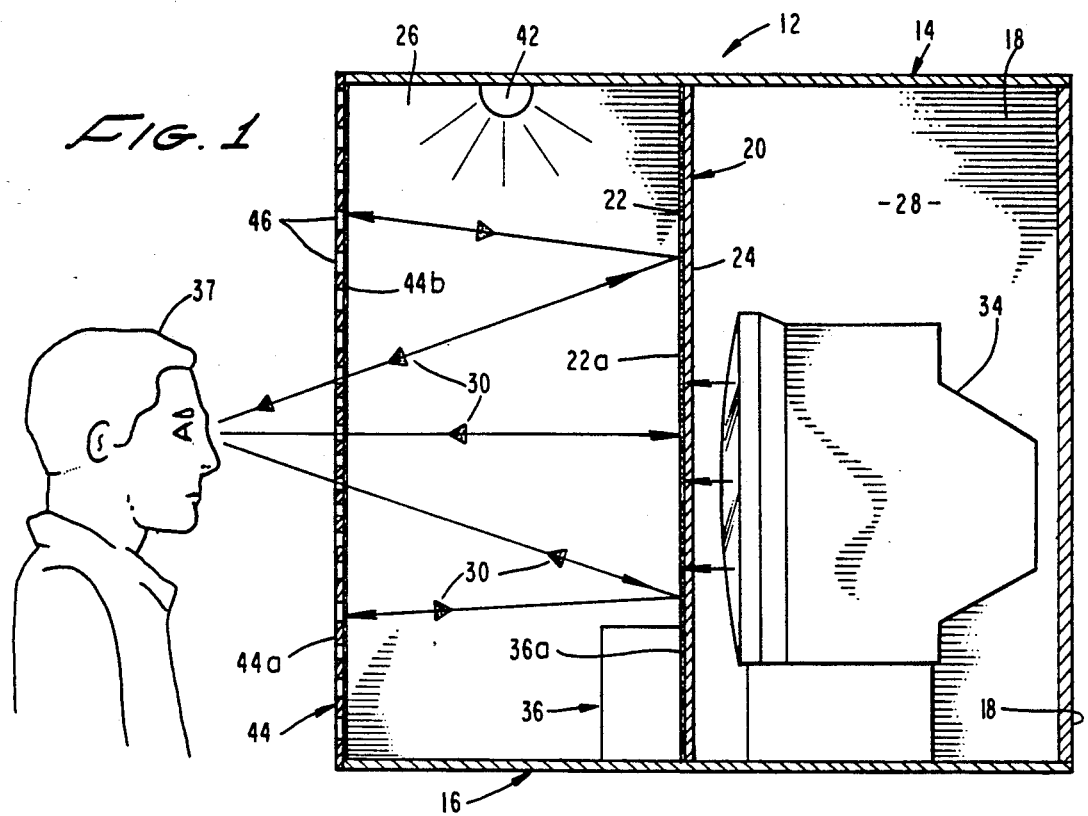
FIG. 1 is a side elevational, cross-sectional view of one form of the apparatus of the invention.
Figure 2:
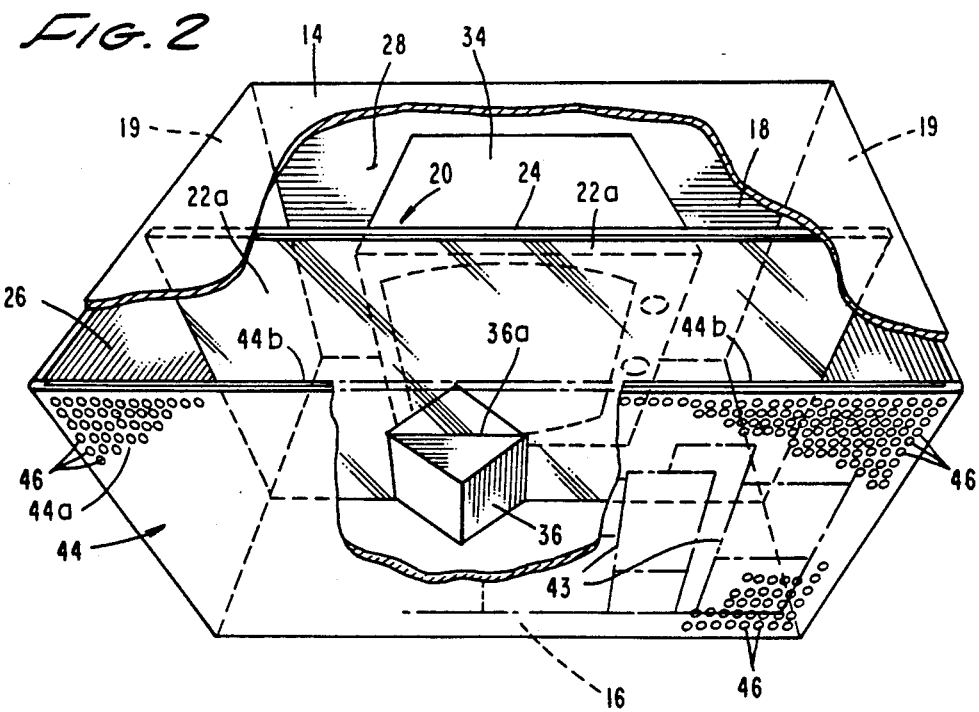
FIG. 2 is a generally perspective view looking angularly downwardly on the apparatus as shown in FIG. 1.

Referring to the drawings and particularly to FIGS. 1 and 2, one form of the illusion creating apparatus of the invention is there shown. This form of the apparatus comprises an enclosure or housing 12 having top, bottom, rear and side surfaces 14, 16, and 18 respectively. A sheet of glass 20 having front and rear surfaces 22 and 24 respectively bisects enclosure 12 to form front and rear portions or compartments 26 and 28 respectively. As indicated in the drawings, front surface, or face, 22 of sheet of glass 20 is provided with a reflective surface 22a which reflects light waves in the manner illustrated by the arrows 30 in FIG. 1. Surface 22a may comprise a silvered surface, a mirror surface or it may comprise any other type of reflective coating of a character well known to those skilled in the art.

Disposed within rear compartment 28 is an imaging means for generating and projecting an image toward the rear face 24 of sheet of glass 20. In the embodiment shown in FIG. 1, the imaging generating apparatus is shown as a television monitor 34. Disposed within front compartment 26 is a three-dimensional object 36. Object 36 preferably comprises one-half of a perfectly symmetrical object and is shown, by way of example in FIG. 2, as one-half of a cube. As indicated in FIG. 2, the perpendicular surface 36a of the one-half symmetrical object, or cube 36, is disposed proximate the front surface 22 of the sheet of glass so that the reflective surface 22a will reflect the object, making the object appear as a perfect cube to a viewer 37 looking in the front of the apparatus. It is to be understood that any number of symmetrical objects can be used in creating the illusion. For example, a prefectly symmetrical vase or genni's lamp can be bisected along its longitudinal axis and positioned against front face 22a of glass plate 22. In such an instance the mirrored surface would reflect the object so that it will appear to the viewer 37 as a complete, perfectly symmetrical vase or genni's lamp.

Forming an important aspect of the apparatus of the present invention is the provision of scrim means disposed between the viewer 37 and the front portion or compartment 26 of the apparatus. The scrim means normally appears opaque to viewer looking into the apparatus but is uniquely constructed so as to permit the viewer to clearly see object 36 when it is illuminated by illumination means such as a lamp 42 provided in compartment 26 (FIG. 1). The scrim means can take various forms. For example, a theatrical scrim or gauze fabric, with an open weave, can be used for the purpose. Similarly a perforated movie screen of plastic or metal, a wire mesh, or a glass sheet of alternating opaque and transparent areas can also be used. The nature of such a semitransparent material is that if the area opposite the viewer is strongly illuminated, the material is apparently transparent. The percentage of transparent and opaque areas can, of course, vary with the light levels of the room and within the apparatus. In the embodiment of the invention shown in FIGS. 1 and 2, the scrim means is provided as a generally vertically disposed panel 44 having a multiplicity of small perforations 46 which extend therethrough so that when object 36 is brightly illuminated, it can be seen by the viewer 37 looking through the perforations 46. However, when the object 36 is unlighted, panel 44 is constructed so that the viewer 37 will see only the dull-colored front surface 44a of the panel (FIG. 1). In many applications, the rear surface 44b of panel 44, which faces the mirrored surface 22a is painted with depictions of scenery and various objects 43 as may be appropriate for the particular illusion to be created.

In using the apparatus of the invention, it will be noted that the viewer 37 upon looking inside the apparatus will apparently see the full depth of the apparatus because the mirrored surface 22a will appear to double the area. The apparent back wall of the apparatus is, of course, in actuality the scenic-painted back 44b of the front panel 44. The video image emanating from video monitor 44, which is projected bright enough to be seen through the half silvered mirror or glass plate 20, will appear as "floating" within the setting of the front compartment.

As previously mentioned, various props and set pieces can be arranged within the front compartment in the same manner as the small half cube 36. Any such symmetrical object which is appropriately bisected will appear to the viewer as a whole object when reflected by the reflective surface 22a. For example, a half genni lamp would be duplicated by the mirror and be reflected as a whole lamp. A video "genni" could then be projected from the video monitor and could be made to appear to the viewer to float up out of the lamp and hover over it. As previously mentioned, since "real image goasts" are not reflected, there are no bad angles or no hidden areas in the apparatus. If the viewer 37 can see into the apparatus he can see the illusion. Additionally the "real image" can be of any proportion. Further, multiple video monitors can be mounted behind the glass so as to effect multiple illusions with a single prop setting in the front compartment.

Because there are no hidden areas or special angles required, the apparatus can be installed virtually anywhere. For example, amidst a setting of books, a small image of a man can emerge from the pages of the book and address the viewer about the story presently to be told. Similarly, the apparatus can easily be incorporated into an interactive display taking images off video discs and creating images in response to viewer's choices.

Figure 3:
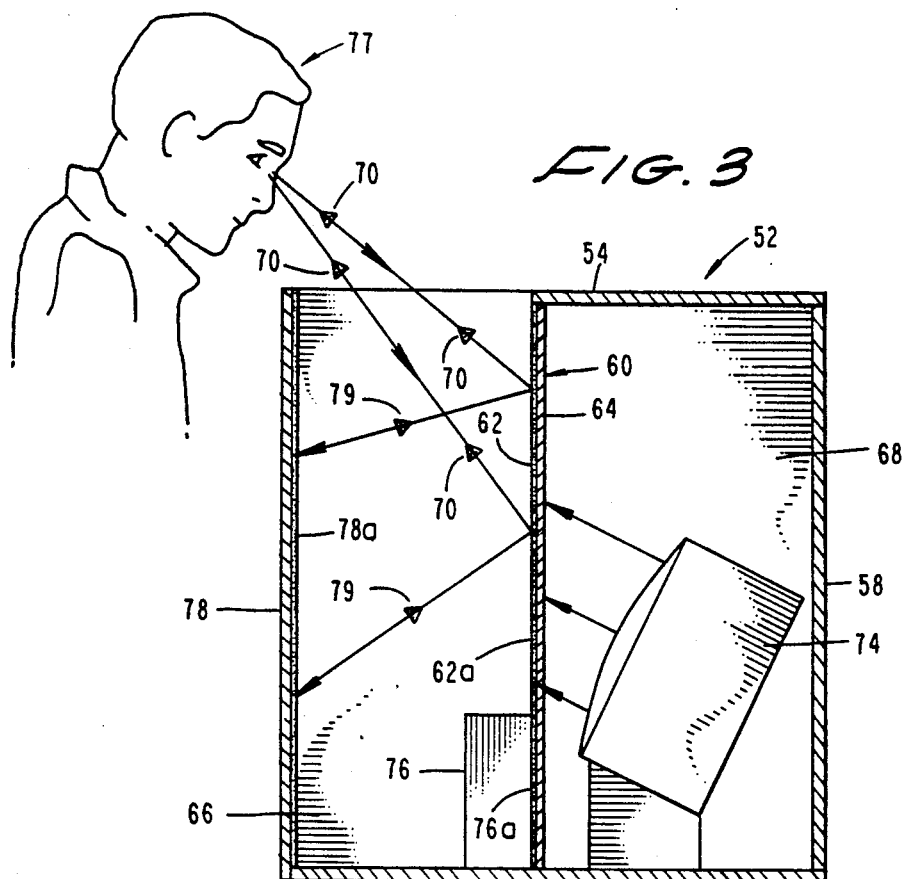
FIG. 3 is a side elevational, cross-sectional view of an alternate form of the apparatus of the invention.

Referring now to FIG. 3 of the drawings, another form of the illusion-creating apparatus of the invention is there shown. This form of the apparatus is similar to that previously described, but the scrim means has been eliminated. The apparatus of this embodiment comprises an enclosure or housing 52 having top, bottom and rear surfaces 54, 56, and 58 respectively. A sheet of glass 60 having front and rear surfaces 62 and 64 respectively bisects enclosure 52 to form front and rear portions, or compartments 66 and 68 respectively. As before, front surface, or face, 62 of sheet of glass 60 is provided with a reflective surface 62a which reflects light waves in the manner illustrated by the arrows 79 in FIG. 3. It is to be noted, however that for reasons presently to be discussed, top wall 54 covers only rear compartment 68.

Disposed within rear compartment 68 is an imaging means or the television monitor 74 for generating and projecting an image toward the rear face 64 of sheet of glass 60. In the embodiment shown in FIG. 3, the television monitor 74 is inclined at an angle to the plane of the sheet of glass to compliment the viewing angle of the viewer 77 who, in this instance, is positioned so as to look downwardly into the apparatus in the manner shown in FIG. 3. Disposed within front compartment 66 is a three-dimensional object 76. As before, object 36 preferably comprises one-half of a perfectly symmetrical object and is shown, by way of example in FIG. 3, as one-half of a cube. As indicated in FIG. 3, the perpendicular surface 76a of the one-half symmetrical object, or cube 76, is disposed proximate the front surface 62 of the sheet of glass so that the reflective surface 62a will reflect the object, making the object appear as a perfect cube to viewer 77 looking downwardly into the apparatus.

Because of the position of the viewer and the substitution of front wall 78 for the scrim means, the illusion is created in much the same manner as previously discussed with the television image appearing as "floating" within the setting of the front compartment. The rear surface 78a of the front wall 78 is appropriately painted so that it is reflected off mirrored surface 62a and seen by the viewer in the manner indicated by the arrows 79.

Figure 4:
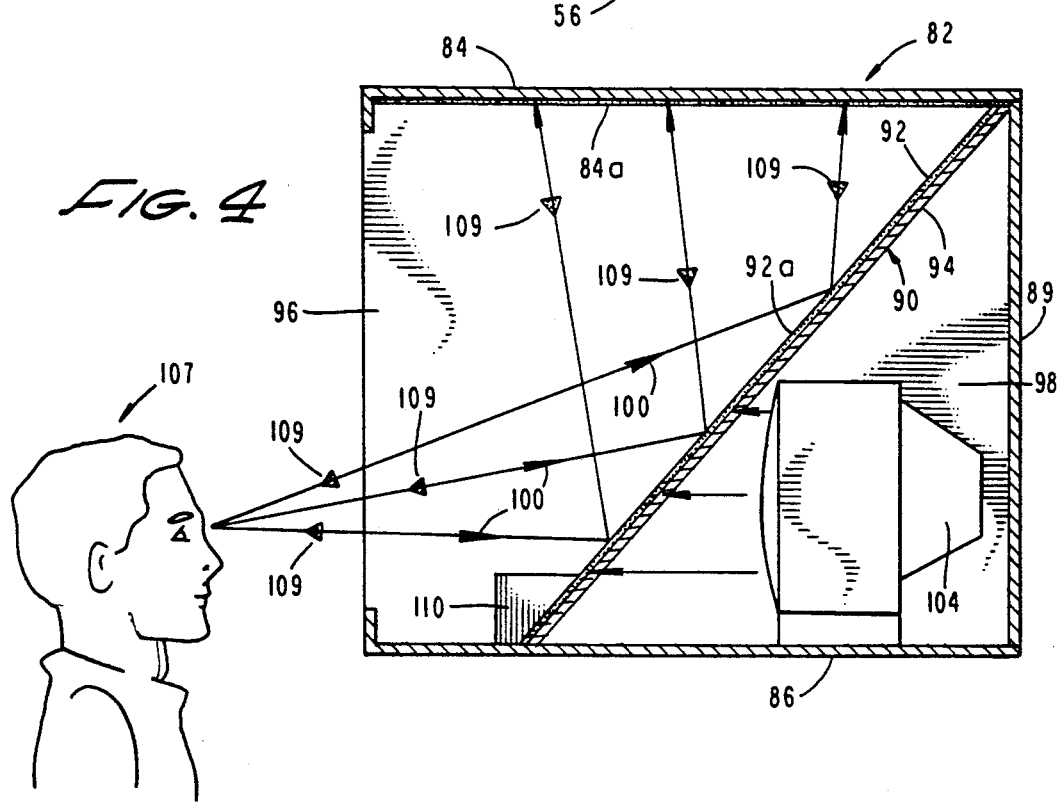
FIG. 4 is a side elevational, cross-sectional view of still another form of the apparatus of the invention.

Turning to FIG. 4 of the drawings, still another form of the illusion-creating apparatus of the invention is there shown. This embodiment is similar to that shown in FIG. 3 but the reflective glass is disposed at an angle within the housing. The apparatus of this embodiment comprises an enclosure or housing 82 having top, bottom and rear surfaces 84, 86 and 88 respectively. A sheet of glass 90 having front and rear surfaces 92 and 94 respectively is angularly disposed within enclosure 82 to form front and rear portions, or compartments 96 and 98 respectively. As before, front surface, or face, 92 of sheet of glass 90 is provided with a reflective surface 92a which reflects light waves in the manner illustrated by the arrows 109 in FIG. 4. It is to be noted that, for reasons presently to be discussed, in the embodiment of FIG. 4 top wall 84 covers both the front and rear compartments and is painted with article-depicting indicia.

As before, an imaging means shown here as a television monitor 104 is disposed within rear compartment 98 for generating and projecting an image angularly toward the rear face 94 of sheet of glass 90.

In using the apparatus shown in FIG. 4, the viewer 107 looks into the open front end of the front compartment in the manner illustrated and will see the reflected image of the indicia 84a painted on the top wall of the enclosure as indicated by the arrows 109. When the front compartment is suitably illuminated, the viewer will also see the reflected image of the object 110 which is disposed within front compartment 96. As before, object 110 preferably comprises one-half of a perfectly symmetrical object having a flat surface disposed adjacent the reflective front surface of the sheet of glass. Object 110 is positioned so that when it is illuminated, the reflective surface 92a of the glass plate will reflect the object, making the object appear as a whole symmetrical object to the viewer 107.

Because of the position of the viewer, the angle of the reflective surface and the depictions painted on the top wall, the illusion is created in much the same manner as previously discussed with the television image appearing as "floating" within the setting of the front compartment.

Having now described the invention in detail in accordance with the requirements of the patent statutes, those skilled in the art will have no difficulty in making changes and modifications in the individual parts or their relative assembly in order to meet specific requirements or conditions. Such changes and modifications may be made without departure from the scope and spirit of the invention, as set forth in the following claims.

I claim:

1. An apparatus for creating an illusion for viewers looking toward the apparatus, comprising:
   (a) a housing having front and rear portions;
   (b) a sheet of glass having front and rear faces disposed intermediate said front and rear portions of said housing, said front face of said sheet of glass being provided with a reflective coating;
   (c) imaging generating means disposed within said rear portion of said housing for generating and projecting an image toward said rear face of said sheet of glass;
   (d) illuminating means for illuminating said front portion of said housing;
   (e) scrim means disposed between the viewers and said front portion of said housing, said scrim means normally appearing opaque to the viewers, but permitting the viewers to see into said front portion of said housing when said front portion is illuminated by said illumination means, said scrim means comprising a panel having front and rear surfaces, said rear surface being provided with depictive material whereby upon illumination of said front portion of said housing said depictive material provided on said panel is viewed by the viewers looking toward the apparatus.

2. An apparatus as defined in claim 1 in which said scrim means comprises a sheet of semi-transparent material having front and rear faces and being provided with a multiplicity of perforations therethrough.

3. An apparatus as defined in claim 2 further including a three-dimensional object disposed within said front portion of said housing, said object having a substantially flat surface disposed against said front face of said sheet of glass.

4. An apparatus for creating an illusion for views looking toward the front of the apparatus, comprising:
   (a) an enclosure;
   (b) a sheet of glass bisecting said enclosure to form front and rear compartments, said sheet of glass having front and rear faces and being provided with a reflective surface on said front face;
   (c) projector means disposed within said rear compartment to project an image toward said rear face of said sheet of glass;
   (d) a three dimensional object disposed within said front compartment, said object having a flat surface disposed against said front face of said sheet of glass;
   (e) means for illuminating said object; and
   (f) a panel of translucent material disposed between the viewers and said front compartment, said panel having front and rear surfaces said rear surface having depictive materials painted thereon.

5. An apparatus as defined in claim 4 in which said reflective surface on said sheet of glass comprises a coating of reflective material.

6. An apparatus as defined in claim 4 in which said sheet of glass is substantially parallel to said panel.

7. An apparatus as defined in claim 6 in which said projector means comprises a television monitor for projecting an image toward said rear face of said sheet of glass.

8. An apparatus for creating an illusion for viewers looking into the apparatus, comprising:
   (a) an enclosure;
   (b) a substantially vertically extending sheet of glass bisecting said enclosure to form front and rear compartments, said sheet of glass having front and rear faces and being provided with a reflective surface on said front face, said front compartment being open at its top and said views looking angularly downwardly into said front compartment;
   (c) a television monitor disposed within said rear compartment for projecting a television image toward said rear face of said sheet of glass;
   (d) one half of a symmetrical object disposed within said front compartment, said object having a flat surface disposed adjacent said front face of said sheet of glass, said object being positioned so that the reflection of the object from said sheet of glass appears to be a whole symmetrical object; and
   (e) a generally vertically disposed panel forming a front wall of material said front compartment, said panel being provided with indicia visible to the viewers looking toward said front surface of said sheet of glass.

9. An apparatus as defined in claim 8 in which said television monitor is angularly inclined with respect to said rear face of said sheet of glass.

10. An apparatus for creating an illusion for viewers looking into the front of the apparatus, comprising:
   (a) an enclosure having top, bottom and rear walls, said top wall having indicia thereon;
   (b) a sheet of glass angularly disposed within said enclosure to form front and rear compartments, said sheet of glass having front and rear faces and being provided with a reflective surface on said front face, said sheet of glass being positioned so that the viewers looking into the front of the enclosure can see the reflected image of said indicia provided on said top wall;
   (c) a television monitor disposed within said rear compartment for projecting a television image angularly toward said rear face of said sheet of glass; and
   (d) one-half of a symmetrical object disposed within said front compartment, said object having a flat surface disposed against said front face of said sheet of glass, said object being positioned so that the reflection of the object from said sheet of glass appears to the viewer to be a whole symmetrical object.

11. An apparatus as defined in claim 10 in which said sheet of glass extends from said bottom wall toward the junction of said top and rear walls.

12. An apparatus for creating an illusion for viewers looking toward the front of the apparatus, comprising:
   (a) an enclosure;
   (b) a sheet of glass bisecting said enclosure to form front and rear compartments, said sheet of glass having front and rear faces and being provided with a reflective surface on said front face, said reflective surface comprising a coating of reflective material;
   (c) projector means comprising a television monitor disposed within said rear compartment to project an image toward said rear face of said sheet of glass;
   (d) a three dimensional object disposed within said front compartment, said object having a flat surface disposed against said front face of said sheet of glass, said object comprising one-half of a symmetrical object so that when said one-half object is reflected it appears whole;
   (e) means for illuminating said object; and
   (f) a panel of translucent material disposed between the viewers and said front compartment, said sheet of glass being disposed substantially parallel to said panel.

13. An apparatus for creating an illusion for viewers looking toward the apparatus, comprising:
   (a) a housing having front and rear portions;
   (b) a sheet of glass having front and rear faces disposed intermediate said front and rear portions of said housing, said front face of said sheet of glass being provided with a reflective coating;
   (c) imaging generating means disposed within said rear portion of said housing for generating and projecting an image toward said rear face of said sheet of glass;
   (d) illuminating means for illuminating said front portion of said housing;
   (e) a perforated panel disposed between the viewers and said front portion of said housing, said panel having front and rear surfaces, said rear surface being provided with depictive material whereby upon illumination of said front portion of said housing said depictive material is reflected by said reflective coating and is viewed by the viewers as an interior background for the apparatus.

14. An apparatus as defined in claim 13 further including a three-dimensional object disposed within said front portion of said housing, said object having a substantially flat surface disposed against said front face of said sheet of glass.

* * * * *